Dec. 1, 1953  G. BONMARTINI  2,661,251
TRACK DEVICE FOR VEHICLES AND THE LIKE
Filed March 20, 1950  2 Sheets-Sheet 1
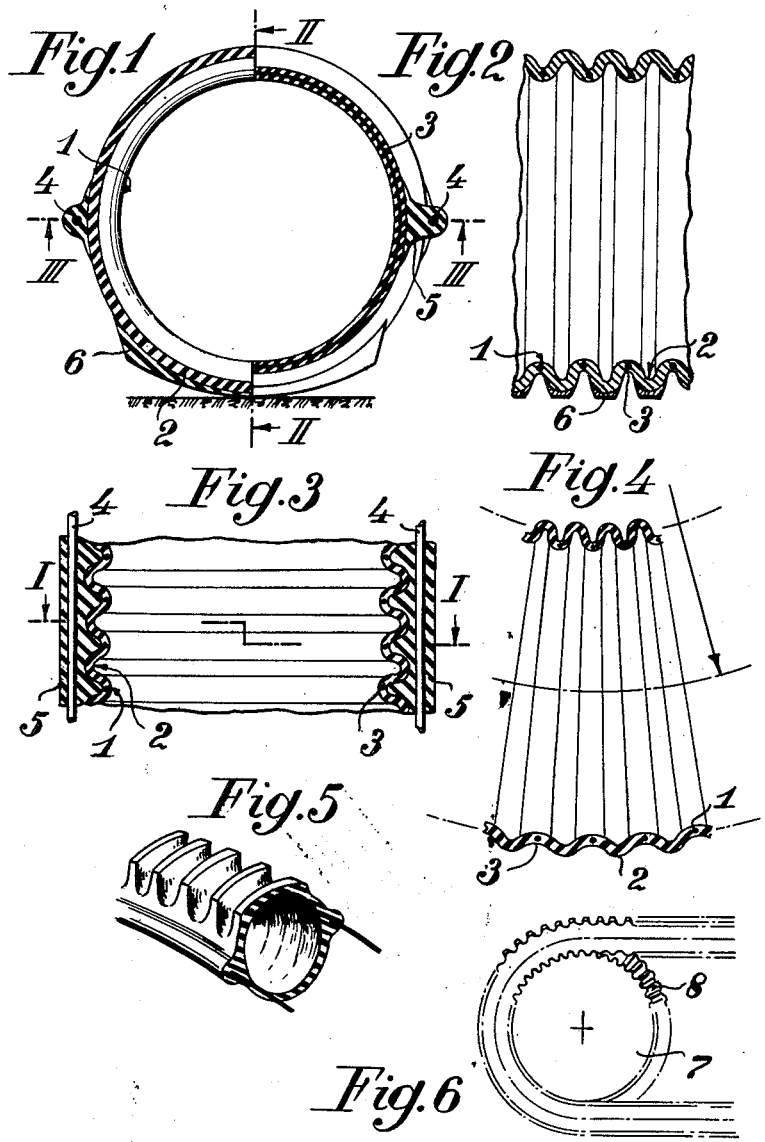
Inventor
Giovanni Bonmartini
By Robert E. Burns
Attorney Dec. 1, 1953 G. BONMARTINI 2,661,251
TRACK DEVICE FOR VEHICLES AND THE LIKE
Filed March 20, 1950 2 Sheets-Sheet 2
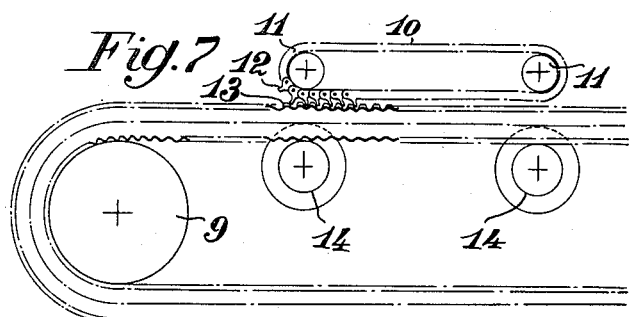
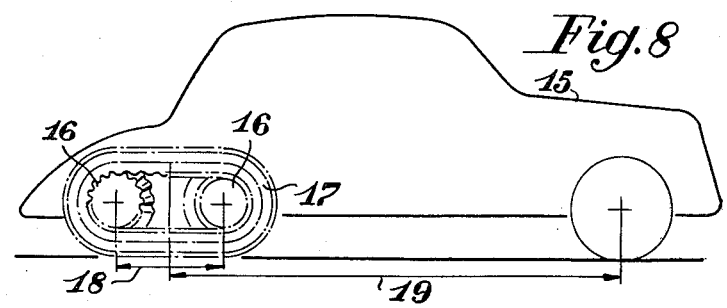
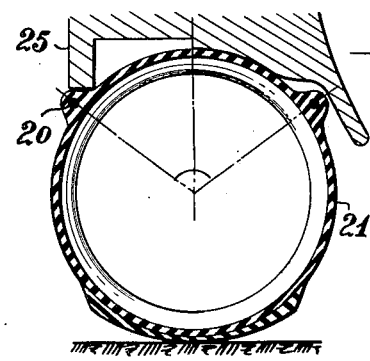
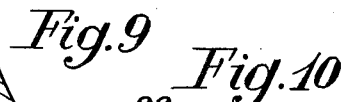
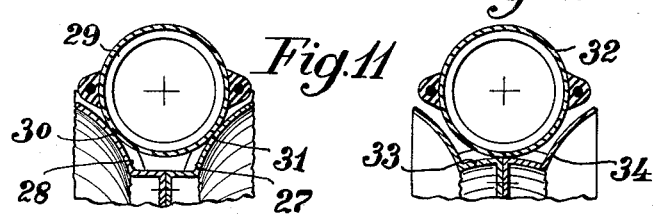
Inventor
Giovanni Bonmartini
By Robert E Burns
Attorney

UNITED STATES PATENT OFFICE 2,661,251

TRACK DEVICE FOR VEHICLES AND THE LIKE

Giovanni Bonmartini, Rome, Italy, assignor to "E S T" Etablissement Sciences Techniques, Vaduz, Liechtenstein, a company of Liechtenstein Application March 20, 1950, Serial No. 150,666

Claims priority, application Italy February 10, 1950

10 Claims. (Cl. 305—10)

This invention relates to improvements in or modifications of the subject matter of my copending patent application Serial No. 91,304 which describes and illustrates a type of a track system for securing a better distribution of the load in a rolling system, and adapted to move over uneven ground and soft materials, e. g. earth, mud, sand and snow.

The proposed track described in my said application is constituted by a thin walled tube of resistant but elastic material, the tube being endless and mounted upon a frame provided with two or more wheels, in such manner that it assumes a mixed linear form. The tube is reinforced by one or more flexible but inextensible elements arranged along one or more of the generatrices of the tube.

The track, as described in my co-pending application, has an external surface which is substantially smooth. Even if the tube is made of an elastic material, it still presents a certain resistance to passing over rollers, particularly if these latter have a small diameter, as the peripheral part of the tube is subjected to lengthening, while the internal part is subjected to shortening.

The present invention proposes to use, for the same purpose, a tube of flexible material which is not smooth but corrugated, i. e. having undulations of toroidal shape directed inwards and outwards of a cylindrical ideal middle surface.

These corrugations allow the tube to be fitted around wheels or guiding rollers of any size without increased stress. In fact, when the track bends around a wheel or roller, or in general is disposed with its axis lying in a curve, the corrugations which are at the periphery are merely pulled, i. e. flattened, in order to adapt themselves to the greater length they have to follow, while the internal corrugations merely move closer together, so as to adapt themselves to the lesser length they are caused to follow.

In both cases there is therefore neither lengthening nor shortening of the wall.

The corrugated track, according to the invention, is provided, as the track described in the above-mentioned co-pending application, with flexible and inextensible elements. They are, however, differently arranged.

The smooth walled tubular element is provided with very close transverse inextensible rings, incorporated in the wall (textile strands) to resist the internal pressure, and with one or more longitudinal inextensible elements, grouped in the zones where lengthening or shortening of the tubular elements had to be prevented. In all the other zones it was not possible to arrange longitudinal inextensible elements, because, as stated above, when a smooth tubular element winds round a wheel, lengthening and shortening occurs.

This action does not occur in my corrugated tubular element, which may be therefore provided with several longitudinal inextensible elements, uniformly distributed in the wall (textile strands), and with spaced transverse inextensible rings arranged in the inner parts of the corrugations (at least a ring for each corrugation).

In the above arrangement the tube maintains its form even if there is substantial internal pressure, and the tube functions correctly, when it is mounted on the supporting wheels under axial tension.

In fact the pressure which is in the tubular element tends to swell the corrugations, but the swelling action is resisted by the axial tension to which the tubular element is submitted, so that the net effect of the swelling action will depend, not only on the characteristics of the particular embodiment of the tubular element, but also on the magnitude of the internal pressure and on the tensile stress to which the tubular element is subjected.

The transverse inextensible rings, arranged in the inner parts of the corrugations, may be incorporated in the wall, or disposed externally.

The longitudinal inextensible elements may be divided in a plurality of superposed layers. They may also be arranged at an angle to the longitudinal, but with a predetermined inclination, i. e. in an helical shape, in order to obtain better resistance to the possible stresses which tend to twist the tubular element upon itself.

In this latter case, it will be advantageous to provide an even number of layers, having helices alternating rightwards and leftwards.

According to one embodiment of the present invention, the tubular element may be provided with longitudinal inextensible elements, not incorporated in the wall (and therefore undulating with this latter), disposed rectilinearly, tangent to the projecting portions of the corrugations and connected to the tubular element by means of material which may or may not fill the corresponding inner portions of the corrugations, in addition to the inextensible elements above described.

These supplementary inextensible elements absorb a portion of the traction stresses of the tubular element, and prevent in their immediate neighborhood any relative motion of the corrugations. These elements allow, therefore, a greater freedom of design of the tubular element and permit the traction stress to which the tubular element is subjected to be varied within larger limits.

Advantageously there may be provided a single supplementary inextensible element, in the shape of a rope or flat ribbon, of metal or of textile material, arranged in the ventral zone of the tubular element. Alternately two inextensible longitudinal elements may be provided, these elements being arranged symmetrically half-way between the ventral and the dorsal zones.

According to another feature of the present invention, in the zone of the tubular element which comes in contact with the ground, there are provided reinforcements, either continuous or discontinuous, i. e. localized in the projecting portions of the corrugations.

The basic advantage of the track according to my present invention, is, as already said, that it is capable of winding itself almost without any stress around wheels or rollers having a relatively small diameter. It is therefore possible, for equal diameters of the tubular element, to employ a frame and wheels having reduced dimensions in comparison with those which are necessary for the tubular elements having smooth walls. Similarly, for a frame and wheels having equal dimensions, a tubular element of larger diameter can be used, and the surface of contact with the ground is therefore increased and the shock-absorbing qualities of the track are improved.

In this connection it may be said that the corrugated tubular track, is, in comparison with the smooth one, like a pneumatic "balloon" tire in comparison with a conventional tire.

Another advantage of my construction is that, other conditions being equal, the resistance to winding of the corrugated tubular element is far less than that of the smooth tubular element, and therefore the driving stress of a vehicle provided with corrugated tracks is considerably reduced.

As a matter of fact, the smooth tubular element operates by means of alternate elongation and shortening of the elastic wall, which entails inevitable losses of power, by reason of the hysteresis of the rubber. In contrast to this, the undulated or corrugated tubular element operates by reason of pneumatic phenomena which occur practically without losses.

Another advantage of the present structure lies in the fact that the corrugated tubular element transmits to the supporting wheels its load better than the smooth tubular element, and, therefore, loads being equal, it can be inflated at a lower pressure.

A further significant advantage is provided by the fact that the stresses to which the walls of the corrugated tubular track are subjected, when compared to the smooth tubular track, are far less important both in type and magnitude.

A still further advantage of the undulated or corrugated tubular element without supplementary inextensible elements, particularly suitable for use on air-craft, lies in the fact that when the tracks touch the ground, the starting stress of the rolling system is diminished by the elongation of the tubular element, the undulations of which, when touching the ground, are moved away from each other, while under the influence of pneumatic forces the others approach each other.

Finally, a further most important advantage of a corrugated tubular track, according to this invention, resides in the fact that a positive traction, or a safe braking effect can be realized by means of suitable teeth provided on the guiding wheels, or by means of toothed devices in general.

The corrugated tube is suitably driven by direct meshing engagement of the driving wheel instead of by friction as in the case described in my co-pending application. The drive can be transmitted both through the internal part and through the external part of the tube, i. e. through that part which is provided with tread elements. In the first case the teeth may be carried by the wheels or rollers of the track. In the second case the teeth may be carried, for instance, by a chain, and in this latter case the motor stress can be distributed along a length of the track.

The corrugations on which the driving stress of the toothed wheels or of the chains is applied, may be protected by metallic material, the metallic protection means adapted in their turn to be directly connected with the inextensible but flexible elements arranged along the generatrices of the cylindrical surface of the tube.

According to the present invention, the smooth or corrugated track may be guided by rollers or wheels provided with projecting elements in the shape of flanges, which support the track only in relation to the flexible and inextensible elements.

It has been found that an effective guiding of the track may be achieved by means of wheels or rollers having a groove which is touched by the track only on its lateral portions and not along its bottom. Alternately, the groove may have a bottom shaped like the periphery of a pulley and in this case the track rests only on the bottom of the groove and remains centered as in the case of a driving belt.

A further possibility provided by the invention is that of coupling several parallel tracks. Such coupling can be conveniently embodied in relation to the flexible but inextensible elements, so that those which are between two tracks are common to the two and the support may be effected only by these elements.

Illustrative embodiments of the invention are shown in the accompanying drawings, wherein:

Fig. 1 shows in cross-section, along the line I—I of Fig. 3, a preferred embodiment of the track according to the invention;

Fig. 2 is a cross-sectional view along the line II—II of Fig. 1;

Fig. 3 is a cross-sectional view along the line III—III of Fig. 1;

Fig. 4 shows how the corrugated tube is deformed when its axis is bent along an arc;

Fig. 5 is a perspective view of the track according to the present invention;

Fig. 6 is a diagrammatic cross-sectional view of a guiding and driving wheel for the track;

Fig. 7 illustrates diagrammatically a different system for operating the track;

Fig. 8 shows, diagrammatically, the application of the track according to the invention, to a motor vehicle;

Fig. 9 shows the arrangement of the flexible but inextensible elements in the ventral zone of the track;

Fig. 10 shows diagrammatically a multiple track having its support system related to the flexible but inextensible elements;

Figs. 11 and 12 show other arrangements for guiding the track.

With reference to the drawing, the track illustrated in its geometrical elements in Figs. 1 to 3, comprises a corrugated tube having inner portions 1 and projecting portions 2 of toroidal shape. These parts are disposed at the two sides of an ideal middle cylinder.

The material from which the track is formed may be, for instance, rubber reinforced by strands arranged longitudinally or obliquely, which constitute the inextensible undulated elements previously mentioned. In each of the inner portions 1 is arranged a flexible but inextensible element 3, for example, a string of textile material. In what may be called the zero plane of the tube are arranged two continuous elements 4, of inextensible but flexible material, for example two steel ropes which form the supplementary inextensible elements.

These ropes are contained within projecting continuous portions 5, formed, for example, of vulcanized rubber. Along the lower part of the tube, each of the corrugations 1 is provided with a tread element 6 which forms the ground-engaging element of the track. As shown in Fig. 1, each of the elements 6 begins approximately in the lower quarter of the corrugation and follows the toroidal form of the portion 1, ending at the periphery by a flattened part.

As shown in Fig. 4, when the tube is bent in any way which is, however, always in a plane passing through the elements 4, since the corrugations which are in proximity to these elements keep their shape unaltered, the external corrugations move away from each other, i. e. are flattened, while the internal corrugations approach one another. This occurs without the intervention of tensile or compression stresses in the material of the tube.

The tube is inflated with sufficient pressure that it will maintain under any condition and insofar as possible, its circular form in transversal cross-section.

With reference to Fig. 6, the guiding wheel or roller 7 may be provided with teeth 8 which transmit to the track a positive traction, meshing with the internal corrugations of the tube.

Naturally, the teeth 8 will be closer than the normal distance between the successive corrugations, because these latter in their winding around the roller or wheel approach one another, as shown, in the upper part of Fig. 4.

If it is desired to apply a large driving force to the track, the system of Fig. 7 may be adopted. In this case, the track winds on smooth or toothed rollers 9 which, however, serve merely to guide it. The driving action is effected by means of a toothed chain 10 carried over rollers 11, the chain 10 meshing with its teeth 12 between the tread elements 13, which are in the upper part of the track. In this case the teeth 12 may have the shape of transmission teeth. In order to counteract the strain exerted by chain 10, on rollers 11, other guiding rollers 14 may be provided. These latter rollers support the track by engagement with its inextensible elements 4. These elements provide a bridge between the rollers 14 and insure good meshing between the teeth 12 of chain 10 and the projections 13 of the track.

By adopting the embodiment shown in Fig. 8 it is possible to provide a motor vehicle, which will travel over soft ground, while maintaining the present system of steering. The usual back wheel of the motor vehicle 15, is replaced by an articulated undercarriage which comprises two driving and guiding wheels 16 on which the track 17 is wound. The distance 18 between the axles of wheels 16 is chosen so that while a sufficient distribution of the load on the ground is provided, the distance 18 is in such a ratio with respect to the distance 19 between the central axis of the back undercarriage and the axle of the front wheel, that this latter is still effective for steering.

In the embodiment shown in Fig. 9, the flexible but inextensible elements 20 are symmetrically arranged in the ventral zone of the track 21 at a distance apart such that the center angle which subtends the elements is of the order of about 90–120°.

The multiple track illustrated in Fig. 10 comprises three tracks 22 connected along the flexible but inextensible elements 24, which in the two outer positions, have the shape of flat ribbons 23. This flat ribbon form is also advantageous to avoid the excessive stresses on these elements, caused by the flexing of the track.

In Figs. 9 and 10 the guiding rollers of the tracks have projecting elements 25 or 26 which support the tracks 21 or 22 only at the flexible but inextensible elements 20, 23 or 24.

Figs. 11 and 12 show other track-guiding systems. In Fig. 11 the roller 27 has a groove 28 in which the track 29 engages only the lateral surfaces, as indicated at 30 and 31. In Fig. 12, on the contrary, the track 32 rests only on the bottom 33 of the groove of the roller 34, the bottom being convex in the shape of a pulley.

1. An endless pneumatic track for track-laying vehicles comprising an endless tubular member formed of flexible material and inflatable with compressed gas, the wall of the tube being provided with sinuous corrugations projecting inwardly and outwardly from an ideal central cylindrical surface having a circular cross section, the corrugations having the same sinuosity on the inner and outer surface of the tubular member, the wall of the tubular member being reinforced by spaced transverse rings of flexible but inextensible material positioned in the inner portion of each corrugation and arranged to keep the diameter of the tubular member unaltered at the inner portions of said corrugations during the inflation of the tubular member with compressed gas, said tubular member being further reinforced by at least two longitudinal elements of flexible but inextensible material incorporated in the wall of the tubular member.

2. An endless pneumatic track as defined in claim 1, wherein the spaced transverse rings are incorporated in the wall of the tubular member.

3. An endless pneumatic track as defined in claim 1, wherein the projecting portions of the corrugations are provided with ground-engaging reinforcement means along their lower surface.

4. An endless pneumatic track for track-laying vehicles comprising an endless tubular member formed of flexible material and inflatable with compressed gas, the wall of the tube being provided with sinuous corrugations projecting inwardly and outwardly from an ideal central cylindrical surface having a circular cross section, the corrugations having the same sinuosity on the inner and outer surface of the tubular member, the wall of the tubular member being reinforced by spaced transverse rings of flexible but inextensible material positioned in the inner portion of each corrugation and arranged to keep the diameter of the tubular member unaltered during the inflation of the latter with compressed gas, at the zones wherein the said transverse rings are positioned, said tubular member being further reinforced by two longitudinal reinforcing elements of flexible but inextensible material, said elements being rectilinear and tangent to the projecting portion of the corrugations.

5. An endless pneumatic track as defined in claim 4, wherein the longitudinal reinforcing elements are spaced apart by an angle of approximately 180°.

6. An endless pneumatic track as defined in claim 4, wherein the longitudinal reinforcing elements are symmetrically disposed in the ventral portion of the tubular member and spaced apart so that the subtended central angle is of the order of 90°–120°.

7. An endless pneumaic track for track-laying vehicles comprising an endless tubular member formed of flexible material and inflatable with compressed gas, the wall of the tube being provided with sinuous corrugations projecting inwardly and outwardly from an ideal central cylindrical surface having a circular cross section, the corrugations having the same sinuosity on the inner and outer surface of the tubular member, the wall of the tubular member being reinforced by spaced transverse rings of flexible but inextensible material positioned in the inner portion of each corrugation, arranged to keep the diameter of the tubular member unaltered during the inflation of the latter with compressed gas, at the zones wherein the said transverse rings are positioned, said tubular member being further reinforced by a plurality of longitudinal elements of flexible but inextensible material distributed along the wall of the tubular member and incorporated therein, whereby during the rolling of the tubular member the transverse rings move away from one another in the external peripheral zone of the track and move toward each other in the internal peripheral zones, while in the intermediate zone between the said peripheral zones the distance between said rings remains practically unvaried and depends upon the internal pressure of the tube.

8. An endless pneumatic track as defined in claim 7, wherein the longitudinal reinforcing elements have a direction parallel to the axis of the tube.

9. An endless pneumatic track as defined in claim 7, wherein the longitudinal reinforcing elements are incorporated in the wall of the tubular member in superposed layers having alternate rightwardly directed and leftwardly directed helices.

10. In an endless pneumatic track for a track-laying vehicle, an endless tubular member formed of flexible material and inflatable with compressed gas, the wall of the tube being provided with corrugations projecting inwardly and outwardly from an ideal central cylindrical surface having a circular cross section, spaced transverse rings of flexible but inextensible material reinforcing said wall at the inner portion of each corrugation, longitudinal elements of flexible but inextensible material incorporated in the wall of the tubular member at opposite sides thereof and spaced wheels over which said tubular member runs with substantially straight portions between said wheels, said wheels having on their peripheries transverse corrugations the spacing of which is less than that of the corrugation of said tubular member in the straight portions of said member.

GIOVANNI BONMARTINI.

References Cited in the file of this patent

UNITED STATES PATENTS

| Number | Name | Date |
|---|---|---|
| 1,794,935 | Ruth | Mar. 3, 1931 |
| 1,986,865 | Tschappat | Jan. 8, 1935 |
| 2,337,074 | Walker | Dec. 21, 1943 |
| 2,365,279 | Kraft | Dec. 19, 1944 |
| 2,461,850 | Slemmons | Feb. 15, 1949 |
| 2,463,121 | Sapp | Mar. 1, 1949 |

FOREIGN PATENTS

| Number | Country | Date |
|---|---|---|
| 63,932 | Norway | Dec. 11, 1942 |
| 982,446 | France | Jan. 31, 1951 |